United States Patent
Unai et al.

(10) Patent No.: US 10,633,158 B2
(45) Date of Patent: Apr. 28, 2020

(54) LAMINATE FOR RETORT PACKAGING AND CONTAINER

(71) Applicant: HOSOKAWA YOKO CO., LTD., Tokyo (JP)

(72) Inventors: Saburo Unai, Tokyo (JP); Toshiharu Iwasaki, Tokyo (JP)

(73) Assignee: HOSOKAWA YOKO CO., LTD., Tokyo (JP)

( * ) Notice: Subject to any disclaimer, the term of this patent is extended or adjusted under 35 U.S.C. 154(b) by 198 days.

(21) Appl. No.: 15/313,853

(22) PCT Filed: May 29, 2015

(86) PCT No.: PCT/JP2015/065518
§ 371 (c)(1),
(2) Date: Nov. 23, 2016

(87) PCT Pub. No.: WO2015/186618
PCT Pub. Date: Dec. 10, 2015

(65) Prior Publication Data
US 2017/0197769 A1  Jul. 13, 2017

(30) Foreign Application Priority Data
Jun. 5, 2014  (JP) .................................. 2014-116867

(51) Int. Cl.
*B32B 27/08*  (2006.01)
*B65D 65/40*  (2006.01)
(Continued)

(52) U.S. Cl.
CPC ................ *B65D 65/40* (2013.01); *B32B 1/02* (2013.01); *B32B 7/12* (2013.01); *B32B 15/08* (2013.01);
(Continued)

(58) Field of Classification Search
CPC ......... B32B 27/30; B32B 27/32; B32B 27/34; Y10T 428/91
(Continued)

(56) References Cited

U.S. PATENT DOCUMENTS 5,089,322 A * 2/1992 Matsunaga ......... C08L 23/0815
428/220
5,756,193 A  5/1998 Yamamoto et al.
(Continued)

FOREIGN PATENT DOCUMENTS

CN  1105140 C  4/2003
CN  1507389 A  6/2004
(Continued)

OTHER PUBLICATIONS

International Search Report for PCT/JP2015/065518.
Office Action dated May 15, 2018 in corresponding Japanese Application No. 2014-116867 with machine translation.

*Primary Examiner* — Ellen S Hock
(74) *Attorney, Agent, or Firm* — MH2 Technology Law Group LLP

(57) ABSTRACT

The invention provides a laminate for retort packaging that can be applied to a retort packaging container having excellent bag drop strength at low temperature, and a container that uses this laminate for retort packaging. A laminate for retort packaging (10), wherein a sealant layer (21) is formed of a resin that is composed mainly of a polyethylene resin composition composed of at least 30% by mass but not more than 50% by mass of a high-density polyethylene, at least 40% by mass but not more than 50% by mass of a linear low-density polyethylene, and at least 10% by mass but not more than 20% by mass of a high-pressure low-density polyethylene.

6 Claims, 2 Drawing Sheets

(51) Int. Cl.

| | |
|---|---|
| *B32B 27/32* | (2006.01) |
| *B65D 81/26* | (2006.01) |
| *B32B 27/28* | (2006.01) |
| *B65D 81/24* | (2006.01) |
| *B32B 27/34* | (2006.01) |
| *B32B 27/06* | (2006.01) |
| *B32B 27/36* | (2006.01) |
| *B32B 27/18* | (2006.01) |
| *B32B 1/02* | (2006.01) |
| *B32B 15/08* | (2006.01) |
| *B32B 15/20* | (2006.01) |
| *B32B 27/30* | (2006.01) |
| *B32B 15/09* | (2006.01) |
| *B32B 7/12* | (2006.01) |
| *C08L 23/06* | (2006.01) |

(52) U.S. Cl.
CPC .............. *B32B 15/09* (2013.01); *B32B 15/20* (2013.01); *B32B 27/06* (2013.01); *B32B 27/08* (2013.01); *B32B 27/18* (2013.01); *B32B 27/28* (2013.01); *B32B 27/304* (2013.01); *B32B 27/306* (2013.01); *B32B 27/308* (2013.01); *B32B 27/32* (2013.01); *B32B 27/327* (2013.01); *B32B 27/34* (2013.01); *B32B 27/36* (2013.01); *B65D 81/24* (2013.01); *B65D 81/26* (2013.01); *B65D 81/266* (2013.01); *C08L 23/06* (2013.01); *B32B 2250/05* (2013.01); *B32B 2250/24* (2013.01); *B32B 2255/10* (2013.01); *B32B 2255/20* (2013.01); *B32B 2255/205* (2013.01); *B32B 2264/102* (2013.01); *B32B 2270/00* (2013.01); *B32B 2307/306* (2013.01); *B32B 2307/308* (2013.01); *B32B 2307/31* (2013.01); *B32B 2307/412* (2013.01); *B32B 2307/50* (2013.01); *B32B 2307/558* (2013.01); *B32B 2307/71* (2013.01); *B32B 2307/7244* (2013.01); *B32B 2307/732* (2013.01); *B32B 2307/74* (2013.01); *B32B 2307/758* (2013.01); *B32B 2439/00* (2013.01); *B32B 2439/40* (2013.01); *B32B 2439/46* (2013.01); *B32B 2439/70* (2013.01); *B32B 2439/80* (2013.01); *B32B 2553/00* (2013.01); *C08L 2203/10* (2013.01); *C08L 2203/162* (2013.01); *C08L 2205/025* (2013.01); *C08L 2205/03* (2013.01); *C08L 2207/062* (2013.01); *C08L 2207/066* (2013.01)

(58) Field of Classification Search
USPC .................... 428/36.91, 34.1, 35.7
See application file for complete search history.

(56) References Cited

U.S. PATENT DOCUMENTS

| | | |
|---|---|---|
| 6,110,549 A | 8/2000 | Hamada et al. |
| 2002/0172833 A1 | 11/2002 | Tsai et al. |
| 2003/0017352 A1* | 1/2003 | Dayrit ................. A23L 3/02 428/475.8 |
| 2005/0142309 A1* | 6/2005 | Goto ................... B32B 27/18 428/34.6 |
| 2009/0041963 A1* | 2/2009 | Kitahara ............. B32B 27/08 428/35.4 |
| 2010/0276321 A1 | 11/2010 | Nakamura et al. |
| 2011/0319571 A1* | 12/2011 | Botros ............... C08L 23/0815 525/333.7 |
| 2012/0215196 A1 | 8/2012 | Kobayashi et al. |
| 2014/0120281 A1 | 5/2014 | Iwasaki et al. |
| 2015/0251390 A1 | 9/2015 | Ishihara et al. |

FOREIGN PATENT DOCUMENTS

| | | |
|---|---|---|
| CN | 101903002 A | 12/2010 |
| CN | 102596144 A | 7/2012 |
| JP | H06-328639 A | 11/1994 |
| JP | 08-142288 A | 6/1996 |
| JP | H09-176336 A | 7/1997 |
| JP | 10-087909 A | 4/1998 |
| JP | 10-244641 A | 9/1998 |
| JP | 11-012558 A | 1/1999 |
| JP | 2000-079663 A | 3/2000 |
| JP | 2001-031768 A | 2/2001 |
| JP | 2001-334620 A | 4/2001 |
| JP | 2002-036448 A | 2/2002 |
| JP | 2002-361811 A | 12/2002 |
| JP | 2003-237002 A | 8/2003 |
| JP | 2005-015055 A | 1/2005 |
| JP | 2006-070108 A | 3/2006 |
| JP | 2006-150624 A | 6/2006 |
| JP | 2007-160919 A | 6/2007 |
| JP | 2009-007589 A | 1/2009 |
| JP | 2011-131565 A | 7/2011 |
| JP | 2011-152788 A | 8/2011 |
| JP | 2012-240329 A | 12/2012 |
| JP | 2013-112795 A | 6/2013 |
| JP | 2014-005077 A | 1/2014 |
| JP | 2013-018211 A | 5/2018 |
| JP | 2014-069864 A | 5/2018 |

\* cited by examiner

LAMINATE FOR RETORT PACKAGING AND CONTAINER

TECHNICAL FIELD

The present invention relates to a laminate suitable for retort packaging, and a container for packaging that uses the laminate.

BACKGROUND ART

Retort packaging is a technique in which by subjecting a pharmaceutical product or foodstuff to high-temperature sterilization and then packaging, the package contents can be stored for long periods. Containers for retort packaging are prepared by forming a laminate (laminated film) of a plurality of laminated resin films into the shape of a bag.

The sealant layer which constitutes the surface that contacts the contents of the retort packaging container requires heat sealing properties and resistance to the high temperatures used during the retort process. In order to satisfy these performance requirements, the sealant layer of a retort packaging container generally employs a film that uses a polypropylene (PP)-based resin.

Polypropylene-based resin films typically contain an added antioxidant for the purpose of preventing thermal degradation caused by oxygen during heating and melting of the resin to produce a film. However, from the viewpoint of the hygiene of the package contents, it is preferable that the sealant layer contain as few additives as possible. Accordingly, the use of polyethylene (PE)-based resins, which require no additives during film production, for the sealant layer is currently being investigated (for example, Patent Literature (PTL) 1).

Further, the glass transition temperature of polypropylene is close to 0° C., meaning the polypropylene adopts a glass-like state and has poor impact resistance at low temperature. Packaging containers that use a polypropylene-based resin for the sealant layer exhibit poor bag drop strength at low temperature, and have tended to suffer from problems of rupture of the packaging container when dropped.

Among the laminates used in containers for packaging, laminates which contain a layer of a film having oxygen absorption properties (namely, an oxygen absorption layer) in order to prevent oxidation of the contents are already known. Specifically, oxygen-absorbing films include a resin having unsaturated bonds, but it is known that oxygen absorption is accompanied by the generation of unpleasant odors. PTL 2 discloses a packaging material which uses a laminate containing a deodorizing layer that captures odorous components emitted from the oxygen absorption layer.
{PTL 1} Japanese Unexamined Patent Application, Publication No. H08-142288
{PTL 2} Japanese Unexamined Patent Application, Publication No. 2011-152788

SUMMARY OF INVENTION

It is known that polyethylene-based resins exhibit inferior heat resistance compared with polypropylene-based resins. As a result, it had been thought that containers having a polyethylene-based resin for the sealant layer were unsuitable for retort processes.

On the other hand, as mentioned above, polypropylene resins are unsuited to use in cold environments, and therefore there are growing demands for a container for retort packaging that exhibits excellent bag drop strength in cold environments and the like.

The present invention has an object of providing a resin laminate that can be applied to a retort packaging container having excellent bag drop strength at low temperature, and a container that uses this laminate.

One aspect of the present invention is a laminate for retort packaging in which the sealant layer is a resin formed mainly of a polyethylene resin composition composed of at least 30% by mass but not more than 50% by mass of a high-density polyethylene, at least 40% by mass but not more than 50% by mass of a linear low-density polyethylene, and at least 10% by mass but not more than 20% by mass of a high-pressure low-density polyethylene.

The melting point of high-density polyethylene may be as high as about 135° C., and therefore if a high-density polyethylene is applied to a sealant layer, the sealant layer is capable of withstanding retort processing. However, high-density polyethylene has inferior impact resistance compared with other polyethylenes, and when used in a material for a packaging container, tends to increase the likelihood of container damage. Further, high-density polyethylene also has other drawbacks, including poor moldability which makes molding of a film or the like difficult.

On the other hand, linear low-density polyethylene and high-pressure low-density polyethylene have melting points of, at most, about 115° C. to 121° C. and about 115° C. respectively, lower than that of high-density polyethylene. However, linear low-density polyethylene has the advantage of exhibiting superior impact resistance to other polyethylenes. Further, high-pressure low-density polyethylene has the advantage of exhibiting excellent moldability upon molding into a film or the like.

The inventors of the present invention discovered that by mixing a high-density polyethylene, a linear low-density polyethylene and a high-pressure low-density polyethylene in the proportions described above, a polyethylene resin composition could be obtained that was applicable to retort processing, had favorable heat resistance, and exhibited excellent impact resistance and moldability. If a laminate in which the polyethylene resin composition of the present invention has been used for the sealant layer is used for a container for retort packaging, then favorable retort resistance can be obtained, and the resulting container has low-temperature impact resistance that is superior to that of containers using polypropylene-based resins. Further, the sealant layer of the present invention uses a polyethylene that contains no additives such as antioxidants from the production stage, and is therefore advantageous from the viewpoint of hygiene.

In the aspect described above, the thickness of the sealant layer is preferably at least 40 µm but not more than 100 µm. Provided the sealant layer has a thickness within this range, a retort packaging laminate having favorable heat resistance and strength can be obtained.

In the aspect described above, it is preferable that an oxygen absorption layer containing an ethylene-vinyl alcohol copolymer with an ethylene content of not more than 29 mol % as the main component and also containing a polyene-based polymer having unsaturated double bonds and a transition metal salt is laminated to one surface of the sealant layer via an adhesive layer, that the sealant layer contains at least 0.025 parts by mass but not more than 0.075 parts by mass of a zeolite and at least 0.025 parts but not more than 0.075 parts of a deodorant per 100 parts by mass of the polyethylene resin composition, and that the deodorant is composed of inorganic particles in which the particle surface has been subjected to functional group modification.

By including the oxygen absorption layer described above in the laminate, any oxygen that penetrates from the outside of the laminate into the interior and any residual oxygen within the contents is absorbed, and in those cases where the laminate is used as a packaging container, the storage properties of the contents are improved.

On the other hand, because the oxygen absorption layer generates unpleasant odors upon absorption of oxygen, in the present invention, a zeolite having a deodorizing action and an inorganic particle-based deodorant are added to the sealant layer. Provided that the amounts added of these components satisfy the ranges described above, a satisfactory deodorizing action is achieved, and satisfactory transparency for a packaging material can be obtained.

In the aspect described above, if the adhesive layer mentioned above is a mixed resin containing at least 40% by mass but not more than 50% by mass of a linear low-density polyethylene-based resin and at least 50% by mass but not more than 60% by mass of a high-density polyethylene-based resin, then favorable molding stability can be achieved when forming the laminate, which is desirable.

Another aspect of the present invention is a container that uses the laminate for retort packaging of the aspect described above.

Because the packaging container of the present invention has a sealant layer with excellent heat resistance, it can be applied to retort packaging. Further, because the container has excellent impact resistance at low temperatures, it can also be used in cold environments and the like.

The laminate of the present invention has a sealant layer formed from a polyethylene-based resin having favorable heat resistance, and can therefore be used as a container for retort packaging, and as a container having excellent impact resistance at low temperature.

DESCRIPTION OF EMBODIMENTS

Figure 1:
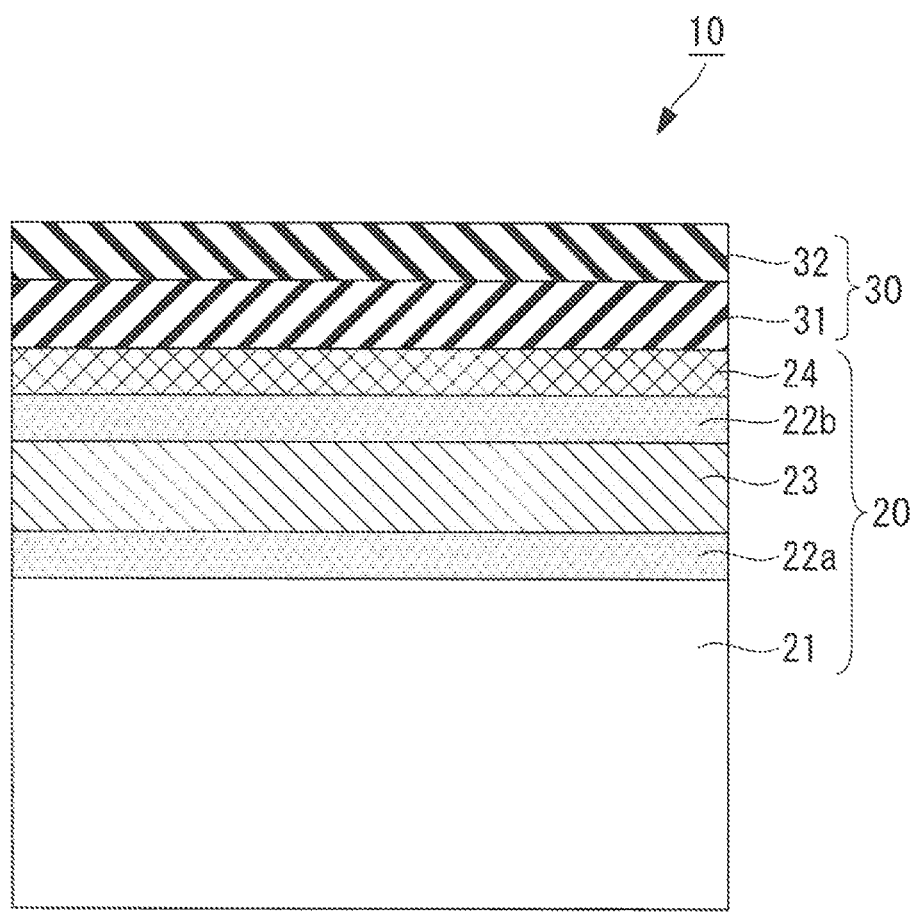
FIG. 1 A schematic cross-sectional view of a laminate for retort packaging according to an embodiment of the present invention.

FIG. 1 is a schematic cross-sectional view of a laminate for retort packaging according to an embodiment of the present invention. The retort packaging laminate 10 is composed of an oxygen-absorbing film 20 laminated to a barrier film 30. The oxygen-absorbing film 20 is composed of a sealant layer 21, an adhesive layer 22a, an oxygen absorption layer 23, an adhesive layer 22b and a substrate layer 24 laminated in that sequence.

The oxygen-absorbing film 20 can be produced by a conventional method such as a co-extrusion method or a lamination method. In the case of a co-extrusion method, a water-cooled film blowing method, air-cooled film blowing method or T-die casting method or the like may be employed. The air-cooled film blowing method, which enables the blowing of thin films and wide films, is particularly advantageous.

Figure 2:
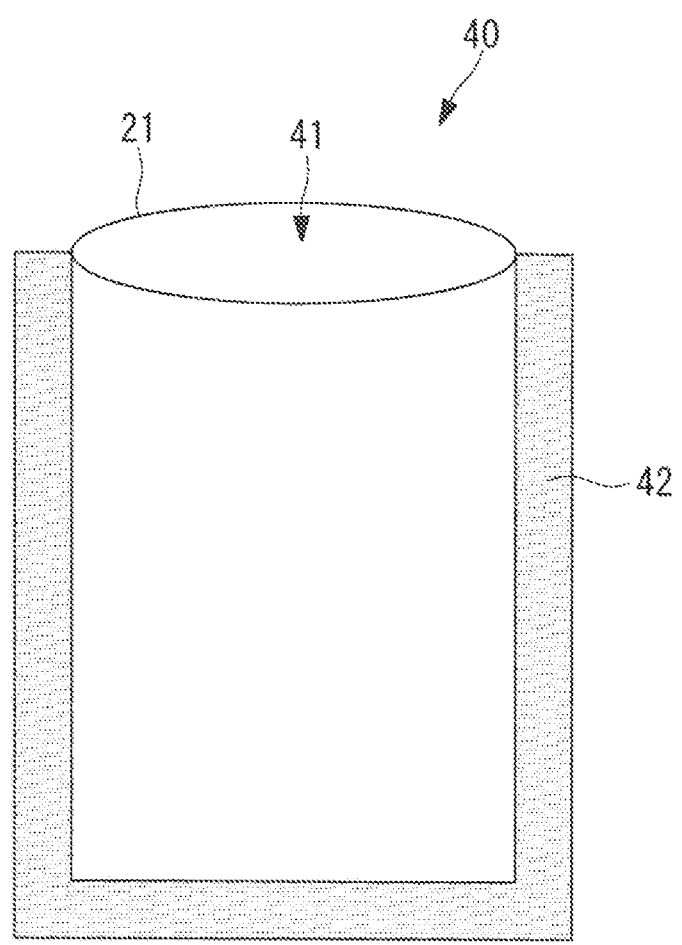
FIG. 2 A schematic view of one example of a container produced using a laminate for retort packaging according to an embodiment of the present invention.

FIG. 2 illustrates one example of a container shape produced using the retort packaging laminate 10 of the present embodiment. The container 40 of FIG. 2 is a rectangular bag-shaped container having a sealing portion 42 that seals the container on three sides via a heat seal. The remaining side is an open portion 41 used for filling the contents, and this side is sealed following filling of the contents. In the case of the bag-shaped container 40, forming is performed so that the sealant layer 21 becomes the inside surface of the bag.

There are no particular limitations on the shape of the container, and examples include two-side sealing, three-side sealing and four-side sealing, as well as pillow packages and gusset bags.

Each layer of the retort packaging laminate 10 is described below.

(Substrate Layer)

The substrate layer 24 is the layer that acts as the bonding surface for the barrier film 30. The substrate layer 24 is a layer having a polyolefin resin as the main component, and more specifically, is formed from a polyethylene resin or a polypropylene resin. Of these, in terms of achieving superior impact resistance at low temperature, the use of a polyethylene resin for the substrate layer 24 is preferred.

Specific examples of the polyethylene resin for the substrate layer 24 include linear low-density polyethylene, high-density polyethylene, high-pressure low-density polyethylene, and mixed resins of these polyethylenes. In consideration of the impact resistance, the substrate layer 24 is preferably a polyethylene resin containing a linear low-density polyethylene, and a mixed resin containing a linear low-density polyethylene and a high-density polyethylene is particularly preferred. The mixing ratio is preferably such that linear low-density polyethylene:high-density polyethylene=50:50 to 70:30 (% by mass). If consideration is also given to the molding stability and the heat resistance, then a ratio of low-density polyethylene:high-density polyethylene=60:40 to 70:30 (% by mass) is more preferred.

The linear low-density polyethylene in this embodiment is also called a straight-chain low-density polyethylene, and refers to a copolymer of ethylene and at least one α-olefin selected from among α-olefins having a carbon number of 3 to 20. Among the α-olefins having a carbon number of 3 to 20, α-olefins having a carbon number of 3 to 12 are preferred. Specific examples include propylene, 1-butene, 1-pentene, 4-methyl-1-pentene, 1-hexene, 1-octene, 1-decene and 1-dodecene, and propylene, 1-butene, 1-hexene and 1-octene are preferred. The proportion of the α-olefin within the copolymer is typically from 1 to 30 mol %, and preferably from 3 to 20 mol %. The linear low-density polyethylene is produced using a Ziegler catalyst or a metallocene catalyst. In terms of achieving superior impact resistance, the use of a linear low-density polyethylene produced using a metallocene catalyst is preferred.

A linear low-density polyethylene having a density of 0.900 g/cm$^3$ to 0.940 g/cm$^3$ and a melt mass-flow rate (MFR) of 0.1 g/10 min to 20 g/10 min can be used particularly favorably as the linear low-density polyethylene. In this description, the density indicates a value measured in accordance with JIS K7112 D. The MFR indicates a value measured in accordance with JIS-K7210, under conditions including a temperature of 190° C. and a load of 21.18 N.

For the high-density polyethylene in the present embodiment, a high-density polyethylene that is a polymer of ethylene and has a density of 0.940 g/cm$^3$ to 0.970 g/cm$^3$ and an MFR of 0.1 g/10 min to 20 g/10 min can be used favorably. High-density polyethylenes applicable to the present embodiment are produced using a Ziegler catalyst or a Phillips catalyst.

For the high-pressure low-density polyethylene in the present embodiment, a high-pressure low-density polyethylene that is a polymer of ethylene and has a density of 0.910 g/cm$^3$ to 0.925 g/cm$^3$ and an MFR of 0.1 g/10 min to 20 g/10 min can be used favorably. The high-pressure low-density polyethylene is produced under high pressure by a radical copolymerization method.

Specific examples of polypropylene resins that can be used as the substrate layer 24 include homo-polypropylene, random polypropylene and block polypropylene. Among these, the use of a block polypropylene is preferred as it offers superior impact resistance.

(Oxygen Absorption Layer)

The oxygen absorption layer 23 is a layer formed from a mixed composition having an ethylene-vinyl alcohol copolymer as the main component, and having a polyene-based polymer having unsaturated double bonds and a transition metal salt as secondary components.

If consideration is given to the heat resistance and the external appearance following retort processing, then the ethylene content in the ethylene-vinyl alcohol copolymer of the present embodiment is preferably not more than 29 mol %.

The polyene-based polymer having unsaturated double bonds is a polymer of a hydrocarbon unit having two or more double bonds. A conjugated diene polymer is preferred as the polyene-based polymer used in the present embodiment. Linear conjugated diene polymers and cyclic conjugated diene polymers can be used as the conjugated diene polymer. Examples of the linear conjugated diene polymers include polyisoprenes, which are polymers of cis- or trans-1,4-isoprene, and polybutadienes, which are polymers of 1,3-butadiene. Examples of the cyclic conjugated diene polymers include cyclized polyisoprenes obtained by a pericyclic reaction of a polyisoprene, and cyclized polybutadienes obtained by a pericyclic reaction of a polybutadiene.

The transition metal salt is a salt of iron, nickel, copper, manganese, cobalt, rhodium, titanium, chromium, vanadium, or ruthenium or the like. The acid used for forming the salt is typically an organic acid, and preferably a monocarboxylic acid (such as stearic acid or neodecanoic acid). The transition metal salt is preferably cobalt stearate or cobalt neodecanoate.

The polyene-based polymer and the transition metal salt mixed into the mixed composition containing an ethylene-vinyl alcohol copolymer as the main component enable oxygen absorption to occur via an oxidative cleavage reaction of the polyene-based polymer catalyzed by the transition metal salt, while producing odorous components such as alcohols, aldehydes, ketones and carboxylic acids that can cause the generation of unpleasant odors. The mixed composition in the present embodiment preferably contains a conjugated diene component that absorbs at least 30 cc of oxygen per 1 g of the diene.

Examples of commercially available mixed compositions having an oxygen absorption capability include the product "Proact" manufactured by Kuraray Co., Ltd., and the product "Quintier" manufactured by Zeon Corporation.

(Sealant Layer)

The sealant layer 21 is the layer that is positioned on the inside surface when the laminate is formed as a bag-shaped container. The sealant layer 21 is bonded by melting during heat sealing.

The sealant layer 21 of the present embodiment is a resin formed mainly of a polyethylene resin composition composed of a high-density polyethylene, a linear low-density polyethylene, and a high-pressure low-density polyethylene.

The same high-density polyethylene, linear low-density polyethylene and high-pressure low-density polyethylene as those described above for the substrate layer may be used. Each of these polyethylenes has a glass transition temperature lower than room temperature (typically about −120° C.). Because the temperature at which the retort packaging laminate 10 is used is higher than the glass transition temperature, each of the above polyethylenes exists in a rubber-like state.

The melting point of high-density polyethylene is about 127° C. to 135° C. On the other hand, high-density polyethylene is inferior to other polyethylenes in terms of impact resistance and moldability. In the present description, melting points of polyethylenes refer to melting peak temperatures measured by differential scanning calorimetry (DSC) in accordance with JIS K 7121.

The melting point of linear low-density polyethylene is about 115° C. to 121° C., whereas the retort temperature is not more than (121° C. to 125° C.). On the other hand, linear low-density polyethylene exhibits favorable impact resistance.

The melting point of high-pressure low-density polyethylene is about 108° C. to 121° C. On the other hand, high-pressure low-density polyethylene has the advantage of exhibiting superior moldability.

The polyethylene resin composition used for the sealant layer 21 of the present embodiment is prepared by mixing at least 30% by mass but not more than 50% by mass of a high-density polyethylene, at least 40% by mass but not more than 50% by mass of a linear low-density polyethylene, and at least 10% by mass but not more than 20% by mass of a high-pressure low-density polyethylene. If the proportion of the high-density polyethylene is less than 30% by mass, then the heat resistance is inadequate, meaning external appearance defects tend to occur following the retort process. In contrast, if the proportion of the high-density polyethylene exceeds 50% by mass, then the moldability deteriorates. If consideration is given to the molding stability and the heat resistance, then it is preferable that the proportion of the high-density polyethylene is from 40% by mass to 45% by mass, the proportion of the linear low-density polyethylene is from 40% by mass to 45% by mass, and the proportion of the high-pressure low-density polyethylene is from 10% by mass to 20% by mass.

The sealant layer 21 contains a zeolite and a deodorant. As described above, the oxygen absorption layer 23 emits odorous components upon oxygen absorption. Among these odorous components, low-molecular weight fatty acids (such as fatty acids having a carbon number of 1 to 7) have an unpleasant odor, but the zeolite and the deodorant exhibit superior fatty acid removal functionality. The deodorant is composed of inorganic particles having surfaces that have been subjected to functional group modification. For example, deodorants formed by modifying the surface of aluminum-based, magnesium-based or zirconium-based inorganic particles with hydroxyl groups can be used. A specific example of the deodorant is the product "KESMON NS-70" manufactured by Toagosei Co., Ltd.

If the sealant layer 21 contains large amounts of the zeolite and the deodorant, then the transparency of the retort packaging laminate 10 (the container 40) deteriorates. In order to ensure a combination of a deodorizing function and favorable transparency, the zeolite is typically added to the above polyethylene resin composition in an amount of at least 0.025 parts by mass but not more than 0.075 parts by mass, and preferably at least 0.035 parts by mass but not more than 0.065 parts by mass, where 100% by mass of the polyethylene resin composition described above is deemed an amount equivalent to 100 parts by mass, whereas the deodorant is typically added to the polyethylene resin composition in an amount of at least 0.025 parts by mass but not more than 0.075 parts by mass, and preferably at least 0.035 parts by mass but not more than 0.065 parts by mass, where 100% by mass of the polyethylene resin composition described above is deemed an amount equivalent to 100 parts by mass.

In order to ensure the addition of prescribed amounts of the zeolite and the deodorant, a master batch is preferably used. A master batch is prepared by adding the zeolite and the deodorant, either individually or as a mixture, to the polyethylene resin composition in high concentrations. Then, in order to achieve the addition proportions described above, an appropriate amount of the master batch is added to the polyethylene resin composition. This enables the zeolite and the deodorant to be mixed uniformly into the polyethylene resin composition.

The thickness of the sealant layer 21 is typically at least 40 μm but not more than 110 μm, and preferably at least 60 μm but not more than 80 μm. If the sealant layer 21 is less than 40 μm, then there is a possibility that the strength of the retort packaging laminate and the heat resistance of the sealant layer 21 may be inadequate. Further, if the thickness of the sealant layer 21 exceeds 100 μm, then not only do the material costs increase, but there is a possibility that the strength of the container using the retort packaging laminate 10 may deteriorate.

(Adhesive Layers)

The oxygen-absorbing film 20 of the retort packaging laminate 10 of the present embodiment is produced using a co-extrusion method or a lamination method or the like. The components of the adhesive layers 22a and 22b may be selected appropriately in accordance with the production method used for the oxygen-absorbing film 20.

In those cases where the oxygen-absorbing film 20 is produced by a co-extrusion method, an adhesive layer formed from a polyethylene-based resin, ethylene-vinyl acetate copolymer, ionomer, or ethylene-(meth)acrylate ester copolymer or the like can be used as the adhesive layers 22a and 22b used for bonding the oxygen absorption layer 23 to the other layers. Polyethylene-based resin adhesives have low odor levels, and are therefore particularly preferred as the adhesive layers 22a and 22b. In the present embodiment, the polyethylene-based resin adhesive used for the adhesive layers 22a and 22b is a mixture of a linear low-density polyethylene adhesive resin and a high-density polyethylene adhesive resin. In consideration of the molding stability and the heat resistance, the mixing ratio of linear low-density polyethylene adhesive resin:high-density polyethylene adhesive resin=40:60% by mass to 50:50% by mass, and is preferably from 45:55% by mass to 50:50% by mass.

The polyethylene-based resin adhesive that may be used in the present embodiment is a graft copolymer of ethylene and an unsaturated carboxylic acid or unsaturated dicarboxylic acid anhydride monomer. The graft copolymer includes 0.01% by mass to 20% by mass of the unsaturated carboxylic acid or unsaturated dicarboxylic acid anhydride monomer and 0.001% by mass to 20% by mass of an added organic peroxide relative to 100% by mass of the polyethylene. In co-extrusion forming, the polyethylene and a mixture of the above monomer and the organic peroxide are supplied to the extruder, and then melted and reacted to form the adhesive layers 22a and 22b.

The unsaturated carboxylic acid or unsaturated dicarboxylic acid anhydride monomer is a compound having at least one double bond and at least one carboxyl group or anhydride (group) thereof. Specific examples include (meth)acrylic acid, maleic acid, phthalic acid, maleic anhydride, phthalic anhydride, itaconic acid, citraconic acid, endic acid, itaconic anhydride, endic anhydride and citraconic anhydride. Either one, or two or more, of the above compounds may be used in the polyethylene-based resin adhesive used for the adhesive layers 22a and 22b of the present embodiment.

Examples of commercially available products for the polyethylene-based resin adhesive include ADMER manufactured by Mitsui Chemicals, Inc., and MODIC manufactured by Mitsubishi Chemical Corporation.

(Barrier Film)

The barrier film 30 is the layer that is used on the outside of the oxygen absorption layer 23 when a container is produced from the retort packaging laminate 10. The barrier film prevents volatile components in the contents from permeating through to the outside of the container, and also prevents oxygen from the air outside the container permeating through the container and reaching the oxygen absorption layer 23 in an amount exceeding the oxygen absorption capability of the oxygen absorption layer 23.

The barrier film 30 is a film having oxygen barrier properties. In the present embodiment, the expression "oxygen barrier properties" means that measurement in accordance with JIS K7126-2 yields an oxygen gas transmission rate of not more than 0.1 ml/day·m²·MPa.

The barrier film 30 is formed from either a single layer or two or more layers of a resin film. The barrier film 30 may also include a metal foil layer of aluminum foil or the like. In those cases where the barrier film 30 is a laminate composed of a plurality of layers, the barrier film 30 can be produced by a lamination method.

Examples of films that may be used for the barrier film 30 include nylon films formed from polyamide resins such as nylon 6 and nylon 66, polyester films such as polyethylene terephthalate (PET), polyethylene naphthalate and polybutylene terephthalate, polyvinylidene chloride films, polyvinyl alcohol films, and ethylene-vinyl alcohol copolymer films.

Vapor deposition films in which a metal film of aluminum or the like, or a metal oxide film of aluminum oxide or silicon oxide or the like, has been formed on the surface a polyester film, nylon film or polypropylene film may also be used for the barrier film 30. In the case of a vapor deposition film, a film of an organic material may be formed on top of the deposited film for the purpose of filling any voids or defects within the deposited film and the purpose of protecting the deposited film.

In the retort packaging laminate 10 of FIG. 1, the barrier film 30 is composed of a nylon film 31 and a vapor deposition film 32 having a PET substrate, in that sequence from the side of the oxygen-absorbing film 20. In this case, the vapor deposition film 32 is arranged so that the deposited film faces the nylon film 31, and the substrate is positioned on the outside surface of the laminate 10. By using this laminated structure, a laminate having excellent strength and pinhole resistance can be obtained. If a film having a deposited film of aluminum oxide or silicon oxide is used as the vapor deposition film 32, then the transparency of the container can be maintained.

In another preferred example of the retort packaging laminate 10, the barrier film 30 is composed of an aluminum foil and PET in that sequence from the substrate side. In this structure, both light and oxygen can be blocked completely, enabling better preservation of the contents.

By using dry lamination or thermal lamination or the like, the oxygen-absorbing film 20 and the barrier film 30 can be bonded together to produce the retort packaging laminate 10.

EXAMPLES

<Production of Oxygen-Absorbing Films>

The oxygen-absorbing films 20 of sample numbers 1 to 13 were produced using a co-extrusion method. The resin used for each layer and the properties thereof are described below.

Mitsubishi Chemical Corporation, density=0.92 g/cm$^3$, MFR=2.2 g/10 min.

The zeolite and deodorant described below were added to the sealant layer 21.

Zeolite: hydrophobic molecular sieve ABSCENTS 3000, manufactured by Union Showa K.K.

Deodorant: inorganic deodorant KESMON NS-70, manufactured by Toagosei Co., Ltd.

The mixing proportions of each of the components for the substrate layer 24, the adhesive layers 22 and the sealant layer 21 in the oxygen-absorbing film 20 of sample numbers 1 to 13 are summarized in Table 1.

TABLE 1

| Sample number | Substrate layer | | Adhesive layer | | Sealant layer | | | | | |
|---|---|---|---|---|---|---|---|---|---|---|
| | | | | | Polyethylene resin composition (% by mass) | | | Zeolite (parts by mass) | Deodorant (parts by mass) | Thickness (μm) |
| | LL (% by mass) | HD (% by mass) | LL-ad (% by mass) | HD-ad (% by mass) | LL | HD | LD | | | |
| 1 | 70 | 30 | 40 | 60 | 40 | 50 | 10 | 0.05 | 0.05 | 70 |
| 2 | 70 | 30 | 40 | 60 | 40 | 40 | 20 | 0.05 | 0.05 | 70 |
| 3 | 70 | 30 | 40 | 60 | 50 | 30 | 20 | 0.05 | 0.05 | 70 |
| 4 | 70 | 30 | 40 | 60 | 30 | 60 | 10 | 0.05 | 0.05 | 70 |
| 5 | 70 | 30 | 40 | 60 | 40 | 50 | 10 | 0.05 | 0.05 | 35 |
| 6 | 70 | 30 | 40 | 60 | 40 | 50 | 10 | 0.05 | 0.05 | 45 |
| 7 | 70 | 30 | 40 | 60 | 40 | 50 | 10 | 0.05 | 0.05 | 110 |
| 8 | 70 | 30 | 40 | 60 | 40 | 50 | 10 | 0.025 | 0.025 | 70 |
| 9 | 70 | 30 | 40 | 60 | 40 | 50 | 10 | 0.075 | 0.075 | 70 |
| 10 | 70 | 30 | 40 | 60 | 40 | 50 | 10 | 0.001 | 0.001 | 70 |
| 11 | 70 | 30 | 40 | 60 | 40 | 50 | 10 | 0.1 | 0.1 | 70 |
| 12 | 70 | 30 | 50 | 50 | 40 | 50 | 10 | 0.05 | 0.05 | 70 |
| 13 | 50 | 50 | 40 | 60 | 40 | 50 | 10 | 0.05 | 0.05 | 70 |

(Sealant Layer 21, Substrate Layer 24)

LL (linear low-density polyethylene): NF324A manufactured by Japan Polyethylene Corporation, density=0.906 g/cm$^3$, MFR=1 g/10 min, melting peak temperature=120° C.

HD (high-density polyethylene): FX229 manufactured by Keiyo Polyethylene Co., Ltd., density=0.952 g/cm$^3$, MFR=2 g/10 min, melting peak temperature=132° C.

LD (high-pressure low-density polyethylene): LM360 manufactured by Japan Polyethylene Corporation, density=0.927 g/cm$^3$, MFR=1.1 g/10 min, melting peak temperature=115° C.

(Oxygen Absorption Layer 23)

AP931B (Proact) manufactured by Kuraray Co., Ltd., density=1.19 g/cm$^3$, MFR=3.5 g/10 min, ethylene content within main component ethylene-vinyl alcohol copolymer=27 mol %.

(Adhesive Layer 22)

HD-ad (maleic anhydride-grafted high-density polyethylene adhesive resin): MODIC H523 manufactured by Mitsubishi Chemical Corporation, density=0.93 g/cm$^3$, MFR=1.5 g/10 min.

LL-ad (maleic anhydride-grafted linear low-density polyethylene adhesive resin): MODIC M123 manufactured by The resin components for the substrate layer 24 and the adhesive layers 22 were mixed by dry blending to prepare a substrate layer raw material and an adhesive layer raw material respectively.

In the preparation of the sealant layer raw material, a master batch was first prepared by mixing in 0.5% by mass of the zeolite and 0.5% by mass of the deodorant. Each of the resin components of the sealant layer were dry blended to produce the polyethylene resin composition, and the master batch was then mixed by dry blending with 100 parts by mass of the polyethylene resin composition so as to achieve the proportions shown in Table 1, thus completing preparation of the sealant layer raw material.

Using an air-cooled blown film-forming machine, an blown film (folded diameter: 780 mm) of the oxygen-absorbing film 20 was produced with the sealant layer 21 becoming the internal surface. The resin temperature during film production was set to 240° C. The thicknesses of the various layers were set to substrate layer 24: 10 μm, adhesive layer 22b: 10 μm, oxygen absorption layer 23: 20 μm, adhesive layer 22a: 10 μm, and sealant layer 21: 35 to 110 μm.

<Production of Retort Packaging Laminates>

Each of the blown films of sample numbers 1 to 13 was cut open, a nylon film and a vapor-deposited polyester film were laminated in this order to the substrate 24 side of the blown film, and a dry lamination method was used to obtain a retort packaging laminate 10. In the examples of the present invention, the following films were used.

Nylon film: G-101 manufactured by Idemitsu Unitech Co., Ltd., thickness: 15 µm.

Vapor-deposited polyester film: IBPET RB manufactured by Dai Nippon Printing Co., Ltd., thickness: 12 µm.

Each of the layers was bonded using a urethane-based adhesive (TM250 manufactured by Toyo-Morton, Ltd.).

<Production of Containers>

Each of the obtained retort packaging laminates 10 was cut to dimensions of 270 mm×300 mm, two sheets of the film were superimposed so that the sealant layers 21 became the inside surfaces, and the peripheral portions were heat sealed on three sides with a seal width of 10 mm to produce a bag-shaped container (bag). The heat sealing was performed under conditions including 220° C., 0.2 MPa and 0.5 seconds. Next, 500 mL of distilled water was placed inside the bag, and the remaining one side was heat sealed under the same conditions.

<Evaluations>

The oxygen-absorbing films and the containers of sample numbers 1 to 13 were subjected to the evaluations described below.

(Molding Stability)

During production using the air-cooled blown method, the presence or absence of oscillations in the bubble of the oxygen-absorbing film was evaluated visually. Those samples in which oscillations were minimal and production was able to be completed with good stability were deemed successful (and recorded as "S" in Table 2), whereas those samples in which oscillations were large and film production was difficult were deemed failures (and recorded as "F" in Table 2).

(High-Pressure Steam Sterilization (Evaluation of Heat Resistance))

Each of the bags described above was mounted on a tray made of a punched metal. The tray was housed inside a high-temperature high-pressure cooking sterilizer (Flavor Ace GPS-60/20SPXTGH, manufactured by Hisaka Works, Ltd.), and subjected to a high-pressure shower sterilization treatment at 125° C. for 10 minutes.

Following the treatment, the bag surface on the side that contacted the tray when the bag was mounted on the tray was inspected visually, and the degree of transfer of the shape of the holes in the tray to the bag was evaluated. The evaluation criteria were as follows.

A: after treatment, almost no traces of the tray holes remained.

B: after treatment, some traces of the tray holes existed, but the bag was still usable.

C: after treatment, traces of the tray holes were very noticeable, and the bag was unusable.

(Total Haze (Transparency))

Following the above sterilization treatment, the bag was left to stand for 24 hours in an environment at 23° C. and 50% RH. The surface of the bag that did not contact the tray was cut to dimensions of 20 mm×20 mm. The total light transmittance of the cut film was determined in accordance with JIS K7136 using a haze meter (HM-150 manufactured by Murakami Color Research Laboratory Co., Ltd.). Samples for which the total light transmittance exceeded a transmittance of 10 were evaluated as failures, and samples having a transmittance of 10 or less were deemed successful.

(Ball Drop Test (Low-Temperature Impact Resistance))

Following the above sterilization treatment, the bag was stored for 24 hours in a room set to 4° C.

Following this storage period, a steel ball of 1.4 kg was dropped onto the bag surface from a standard height (40 cm). In those cases where dropping of the ball from the standard height caused the bag to break, a steel ball of the same weight was dropped from a point 20 cm lower than the standard height (namely, a height of 20 cm). When dropping of the ball from the standard height caused no bag breakage, a steel ball was dropped from a point 20 cm higher than the standard height (namely, a height of 60 cm). This test was performed for a total of 10 bags, and a 50% break height ($H_{50}$, units: cm) was calculated using formula (1). A 50% break height of 60 cm or higher was evaluated as a success, whereas a result of less than 60 cm was deemed a failure.

{Numerical Formula 1}

$$H_{50} = H_i + d\left(\frac{\Sigma(i \cdot n_i)}{N} \pm \frac{1}{2}\right) \quad (1)$$

$H_i$: height standard, test height when i=0 (indicating the height at which bag breakage is expected, $H_i$=40 cm in this test).

d: height interval when test height is raised or lowered (20 cm in this test).

i: height level that increases or decreases by 1 from a value of 0 at $H_i$ (wherein i is an integer such as −3, −2, . . . 2, 3, . . . ).

$n_i$: the number of bags that broke (or did not break) at each level.

N: total number of bags that broke (or did not break) (N=Σ$n_i$).

In formula (1), the larger value between the number of bags that broke and the number of bags that did not break, or either of the two values when the values are equal, is used for $n_i$ and N.

±½: set to −½ when the number of bags that broke is used for $n_i$ and N, or set to ½ when the number of bags that did not break is used.

(Evaluation of Oxygen Absorption Capability)

Immediately after the above sterilization treatment, and then 2 hours after the treatment, the amount of dissolved oxygen within the contents of the container (distilled water) was measured using an oxygen concentration measurement device (Fibox3 Trace V3, manufactured by Sanyo Trading Co., Ltd.). Subsequently, the bag was stored in an oven at 40° C. and 75% RH, and the dissolved oxygen concentration within the contents was measured once per day. The number of days for which the dissolved oxygen concentration could be maintained at 0 ppm was measured until a result other than 0 ppm was obtained for the measured dissolved oxygen concentration. In the case of bags for which a dissolved oxygen concentration of 0 ppm was detected on the 180th day, the number of days for which a dissolved oxygen concentration of 0 ppm could be maintained was recorded as 180 days, and the test was stopped.

Bags for which the number of days on which dissolved oxygen of 0 ppm was detected was 180 days or more were evaluated as successful, whereas bags having a result of less than 180 days were evaluated as failures.

(Evaluation of Odor)

Bags of the size described above were filled with 600 cc of air instead of distilled water, and the sterilization treatment described above was performed under conditions of 125° C. for 10 minutes. Following treatment, the bags were stored for 24 hours in a room held at 4° C.

The air inside the bags was smelt by 6 testers, and the odor was evaluated against the following criteria. The average value of the obtained evaluation grades was then calculated.

An average value of 3.5 or less was deemed a success, whereas an average value exceeding 3.5 was evaluated a failure.

Evaluation Criteria
0: no odor
1: barely detectable odor (detection threshold concentration)
2: weak odor that is recognizable (recognition threshold concentration)
3: easily detectable odor
4: strong odor
5: intense odor The results of performing the above evaluations for sample numbers 1 to 13 are shown in Table 2.

TABLE 2

| Sample number | Molding stability | High-pressure steam sterilization (heat resistance) | Total haze | Ball drop test (cm) | Oxygen absorption capability (number of days of 0 ppm) | Odor |
|---|---|---|---|---|---|---|
| 1 | S | A | 10 | 100 | 180 days | 3 |
| 2 | S | A | 9 | 120 | 180 days | 3 |
| 3 | S | B | 7 | 150 | 180 days | 3 |
| 4 | F | — | — | — | — | — |
| 5 | S | C | 10 | 20 | 30 days | 4 |
| 6 | S | A | 10 | 60 | 180 days | 3.5 |
| 7 | S | A | 14 | 40 | 180 days | 2.5 |
| 8 | S | A | 9 | 100 | 180 days | 3.5 |
| 9 | S | A | 11 | 100 | 180 days | 2.5 |
| 10 | S | A | 9 | 100 | 180 days | 4 |
| 11 | S | A | 28 | 100 | 180 days | 2 |
| 12 | S | A | 10 | 100 | 180 days | 3 |
| 13 | S | A | 10 | 100 | 180 days | 3 |

Sample numbers 1 to 4 show the results of changing the composition of the polyethylene resin composition of the sealant layer 21. Sample numbers 1 to 3 each had satisfactory heat resistance. Further, favorable results were also obtained for the total haze, the ball drop test, the oxygen absorption capability, and the odor evaluation. Sample numbers 1 and 2 exhibited particularly superior properties.

In the case of sample number 4, the HD (high-density polyethylene) in the polyethylene resin composition of the sealant layer 21 was 60% by mass, and therefore molding defects occurred. Accordingly, because a container was not produced using the oxygen-absorbing film of sample number 4, the remaining evaluations were not performed.

Sample numbers 1 and 5 to 7 show the results of changing the thickness of the sealant layer 21.

Sample number 5 in which the sealant layer 21 was thin failed the heat resistance and ball drop tests. Further, the heat resistance of the sealant layer 21 was poor, and the sealing properties of the heat sealed portion were unsatisfactory, meaning the oxygen absorption capability was also unsatisfactory. Further, because the amounts of the zeolite and the deodorant within the sealant layer 21 were relatively smaller, the odor evaluation was also a failure.

Sample number 7 in which the sealant layer 21 was thick exhibited favorable heat resistance and a favorable oxygen absorption capability and the like, but the impact resistance (ball drop test) was poor.

Sample numbers 1 and 6, in which the thickness of the sealant layer 21 was within a range from 40 μm to 100 μm, yielded successful results in all of the tests.

Sample numbers 1, and 8 to 11 show the results of changing the amounts of the zeolite and the deodorant while keeping the thickness of the sealant layer 21 constant.

As the amounts of the zeolite and the deodorant were increased, the odor evaluation improved, but the total haze increased. By ensuring that the amounts of the zeolite and the deodorant are each within a range from at least 0.025 parts by mass to not more than 0.075 parts by mass (sample numbers 1, 8 and 9), a good balance between the transparency and the deodorizing properties could be obtained.

Sample numbers 1 and 12 show the results of changing the composition of the adhesive layers 22. As is evident from Table 2, sample numbers 1 and 12 yielded almost the same level of performance. This indicates that the composition of the adhesive layers 22 composed of a polyethylene-based adhesive resin does not have a significant effect on the molding stability of the oxygen-absorbing film 20, or the performance, and particularly the heat resistance, impact resistance and oxygen barrier properties, of the container.

Sample numbers 1 and 13 show the results of changing the composition of the substrate layer 24. As is evident from Table 2, sample numbers 1 and 13 yielded almost the same level of performance. This indicates that the composition of the substrate layer 24 does not have a significant effect on the molding stability of the oxygen-absorbing film 20, or the performance (the heat resistance, impact resistance and oxygen barrier properties) of the container.

REFERENCE SIGNS LIST

10 Retort packaging laminate
20 Oxygen-absorbing film
21 Sealant layer
22a, 22b Adhesive layer
23 Oxygen absorption layer
24 Substrate layer
30 Barrier film
31 Nylon film
32 Vapor deposition film
40 Container
41 Open portion
42 Sealing portion

The invention claimed is:
1. A laminate for retort packaging, comprising:
an oxygen-absorbing film laminated to a barrier film, wherein:
the oxygen-absorbing film consists of a sealant layer, a first adhesive layer, an oxygen absorption layer, a second adhesive layer, and a substrate layer;
the sealant layer consists of a polethylene resin composition, a zeolite, and a deodorant wherein:

the polyethylene resin composition consists of at least 40% by mass but not more than 50% by mass of a high density polyethylene, at least 40% by mass but not more than 50% by mass of a linear low-density polyethylene, and at least 10% by mass but not more than 20% by mass of a high pressure low-density polyethylene; wherein the zeolite consists of at least 0.025 parts by mass but not more than 0.065 parts per 100 parts by mass of the polyethylene resin composition; wherein the deodorant consists of inorganic particles having surfaces that have been subjected to function group modification and wherein the deodorant consists of at least 0.025 parts but not more than 0.065 parts per 100 parts by mass of the ployethylene resin composition;

the oxygen absorption layer consists of an ethylene-vinyl alcohol copolymer with an ethylene content of not more than 29 mol % as a main component and a polyene-based polymer having unsaturated double bonds and a transititon metal salt, and is laminated to one surface of the sealant layer via the first adhesive layer; and the substrate layer consists of a polyolefin resin and acts a bonding surface for the barrier film, and is laminated to one surface of the oxygen absorption layer via the second adhesive layer.

2. The laminate for retort packaging according to claim 1, wherein a thickness of the sealant layer is at least 40 µm but not more than 100 µm.

3. The laminate for retort packaging according to claim 1, wherein the first adhesive layer and the second adhesive layer are a mixed resin comprising at least 40% by mass but not more than 50% by mass of a linear low-density polyethylene-based resin, and at least 50% by mass but not more than 60% by mass of a high-density polyethylene-based resin.

4. A container comprising the laminate for retort packaging according to claim 1.

5. A container comprising the laminate for retort packaging according to claim 2.

6. A container comprising the laminate for retort packaging according to claim 3.

* * * * *